Dec. 14, 1948.　　　K. E. COPPOCK ET AL　　　2,456,175
FRONT POST AND WINDSHIELD CONSTRUCTION
Filed Jan. 24, 1945　　　　　　　　　　　　2 Sheets-Sheet 1
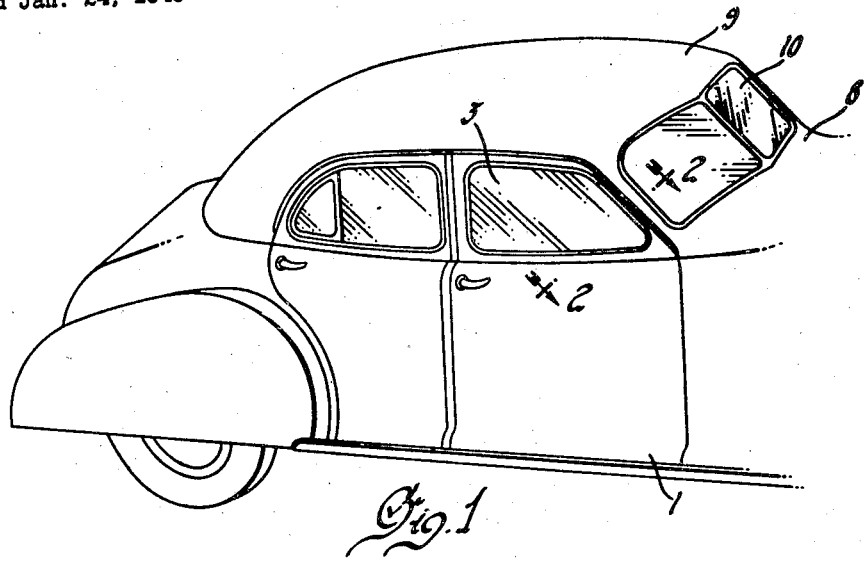
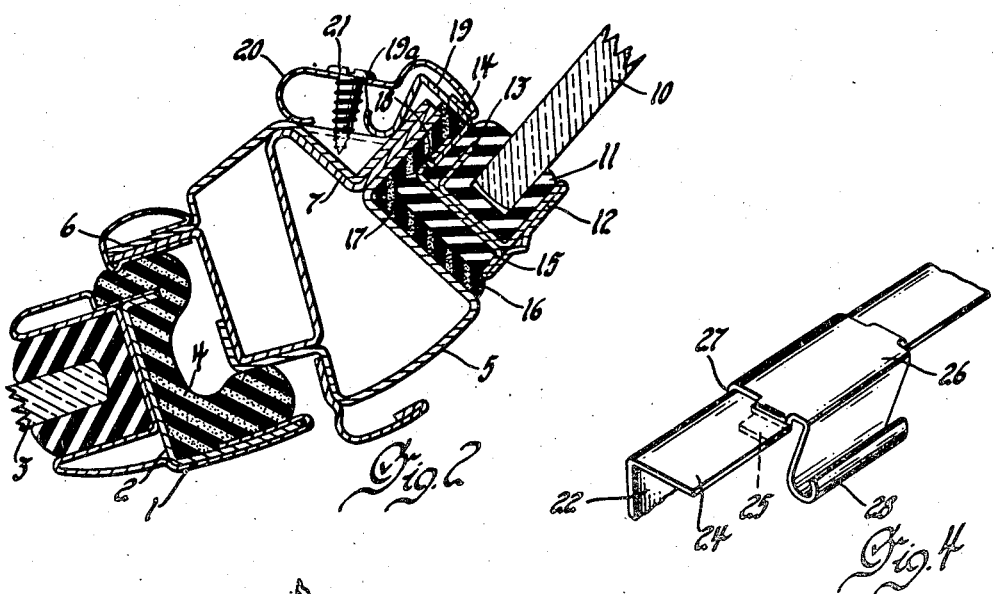
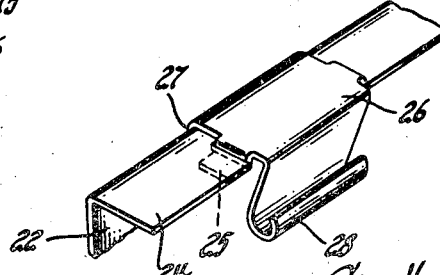
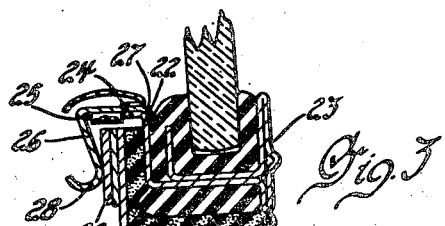
Inventors
Kenneth E. Coppock &
Glen A. Smith
By
Bhelmor, Spencer & Hurt
Attorneys

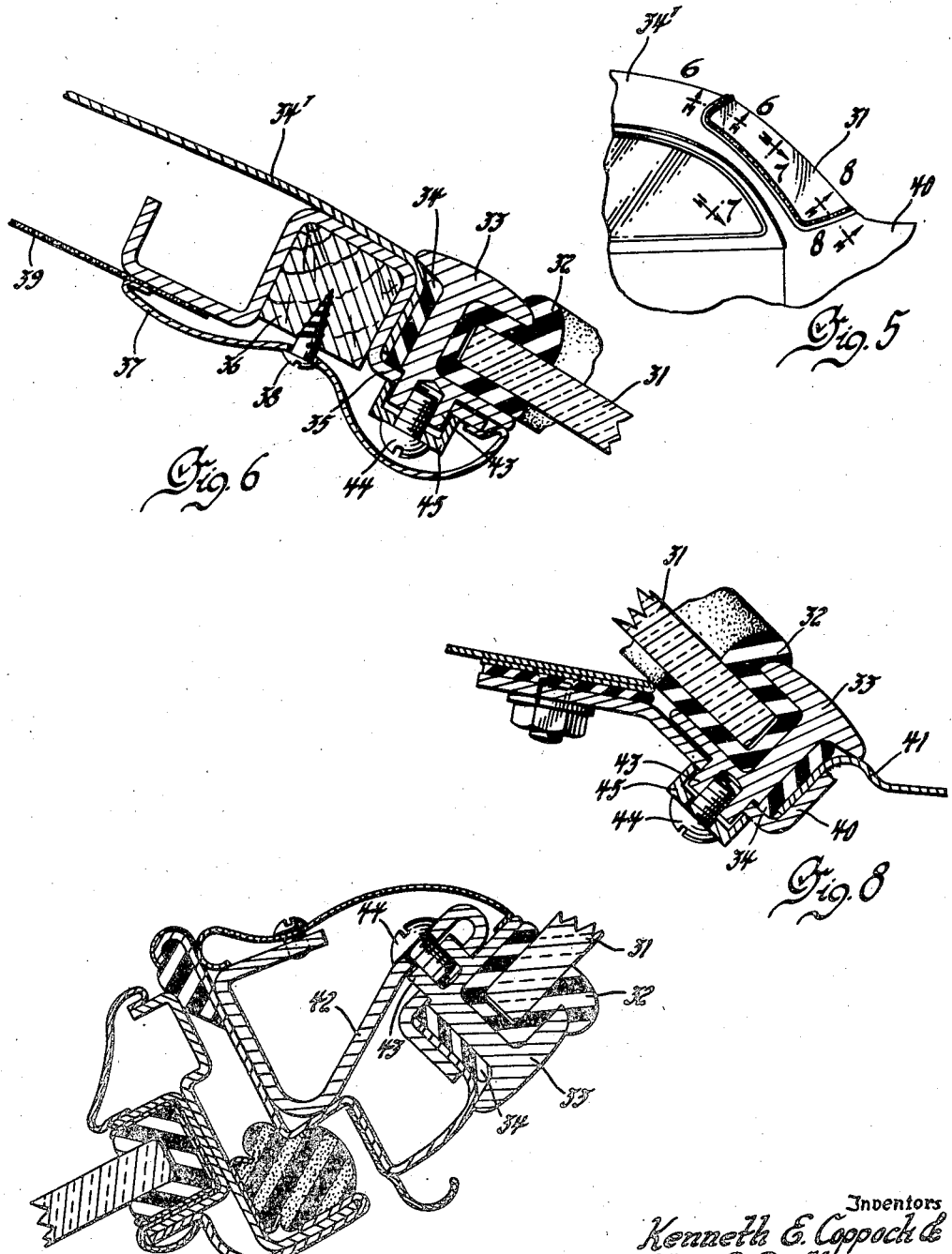

Patented Dec. 14, 1948

2,456,175

UNITED STATES PATENT OFFICE 2,456,175

FRONT POST AND WINDSHIELD CONSTRUCTION

Kenneth E. Coppock, Pleasant Ridge, and Glen A. Smith, Detroit, Mich., assignors to General Motors Corporation, Detroit, Mich., a corporation of Delaware Application January 24, 1945, Serial No. 574,344

7 Claims. (Cl. 189—76)

This invention relates to automobiles and has particular reference to a mounting of a windshield at the front of the vehicle. The invention is particularly adapted for the mounting of a windshield which is curved in two directions, although it may be employed advantageously with flat glass.

Some difficulty has been encountered by glass manufacturers in accurate making of a curved windshield. It is difficult to make the windshield to exact requirements and a given tolerance must be allowed. With a view to mounting a curved windshield in the windshield opening and not unduly straining the glass, the present invention was devised. The edge of the windshield glass is mounted in the usual rubber mounting supported by the metal channel but in back of and behind the usual support there is positioned a strip of soft or sponge rubber which extends entirely around the windshield. In lieu of using screws to secure the windshield sash rigidly in the frame constituting the windshield opening, fastenings are used which will yield under strain. The use of spring clips is preferred over inflexible connectors for the reason that when unyielding mountings are tightened it is possible that the tightening is done to such an extent that there will be strain on the sash and the glass or even in some instances the windshield glass will be cracked.

On the drawing Figure 1 is a perspective view of an automobile body with which the invention is used.

Figure 2 is an enlarged sectional detail on line 2—2 of Figure 1 and through the windshield at the front door post.

Figure 3 is a sectional view of a modification.

Figure 4 shows in perspective the mounting of the spring clip of Figure 3.

Figure 5 is a side elevation of a fragment of the forward part of a car body.

Figures 6, 7 and 8 are sections on lines 6—6, 7—7 and 8—8, respectively, of Figure 5.

Referring to Figures 1 and 2, the door is indicated at 1 and comprises the usual frame 2 and raisable and lowerable window 3. The front door post is indicated at 5 and the seal between the door and the post is indicated at 4.

The hollow door post 5 is made up of a number of sheet metal pressings shaped and joined together for maximum strength and for forming front and rear shouldered or L-shaped abutment portions as shown at 6 and 7 for the door and windshield, respectively. The forwardly projecting angular flanges at the windshield supporting ledge portions 7 of the side body posts combine with and form continuations of similar shouldered or L-shaped ledges at the rear edge of the cowl 8 and the front edge of the roof 9 so as to constitute a frame bounding the windshield opening of the body.

Closing the opening is a windshield glass 10 having as usual a rubber seal channel 11 peripherally embracing the glass 10. This rubber strip is molded or extruded to the special S-shaped section so that the inwardly facing channel receives the glass and the outwardly facing channel receives the central wall or flange of a double channel rail 12 of the window sash. The sash rail is bent up from a single metal strip into a wide channel and a narrow channel nested one within the other to afford a double wall flange on the exterior of the windshield and a pair of spaced single wall internal flanges 13 and 14 to afford between them a narrow channel receiving the terminal leg of the S-shaped rubber strip 11. A second rubber strip 15 is peripherally cemented against the peripheral surface of the sash.

Between the rubber 15 and the door post 5 there is secured in position such as by cementing, a strip of soft rubber 16. Between the inner flange 14 of the channel 12 and the flange 7 of the door post 5 there is secured as by cementing a second strip of soft rubber 17, which may be integral with the strip 16 and consist of sponge rubber.

The wall 14 of the channel 12 has a plurality of openings spaced along its length. In each opening there is received the turned in end or tongue 18 of a spring clip indicated as a whole at 19. The spring clip is of generally U shape and has the curved tail part 19a. The spring clip is forced in place by pressing it between the rubber 11 and the side 14 until the tongue 18 snaps into retaining relation with the opening in the flange 14. The tension in the spring clip 19 will hold it in place. Its flexible anchorage together with the elasticity of the rubber strips 16 and 17, held under slight compression relieves strain on the window glass.

A suitable molding strip 20 is secured over the corner of the post 5 and covers the clips 19. The trim molding 20 is secured in place by means of the screws 21 and precludes accidental displacement of the clips.

The structure of Figure 3 differs from that of Figure 2 in that the side 22 of the channel 23 has a flange 24 provided with a plurality of pairs of cut-outs or slots spaced along its length. In each pair of cut-outs there fits the side fingers 25 of a spring clip 26 which is of the shape shown in the perspective view Figure 4. This clip has the end flange 27 which fits inside the channel 23 and its fingers 25 pass under the flange 24 to lock the clip in place. The inner or free end of the clip is curved at 28 and presses against the interior of the door post flange 29.

The structure of Figures 5 to 8 is to accomplish the same purpose. The windshield 31 has the usual rubber channel 32 around its edge. The rubber 32 is received in the sash 33 which is of the shape shown in the cross sectional views. In the sectional views it will be seen that an angular ledge or frame is provided to receive the sash 33 with a load carrying rubber strip 34 interposed between the sash and its frame.

At the top of the vehicle where the windshield 31 joins the roof 34', the L-shaped ledge is afforded by a reinforcing member 35 having a suitable filler 36 to which a molding or finishing strip 37 may be secured by means of the screws 38. The trim 39 for the underside of the roof is secured between the inner edge of the finishing strip 37 and the rearmost part of the reinforcing member 35. At the bottom of the windshield the sash rests against the supporting ledge formed by an angular strip 40 welded to the cowl 41. At each side the sash fits the angular ledge afforded by a shouldered formation on the corner post 42.

In this instance the attachment of the sash to its supporting ledge is by means of a series of spaced lugs 43 carried by the sash for projection through corresponding openings in the ledge with a sloppy fit to accommodate placement without strain. For retaining the parts against displacement the several lugs 43 are internally drilled and threaded to receive screw studs 44 whose heads seat on the ledge of the window frame, either directly as in Figure 7 or through a spacer cap 45 as in Figures 6 and 8.

The several references herein made to rubber strips will be understood to contemplate strips of nonmetallic elastic deformable material or the like whether of natural rubber, synthetic rubber or other composition.

We claim:

1. In combination, a window frame having a sash supporting ledge of L-section with one leg thereof lying substantially parallel to the plane of the window glass and the other leg extending laterally outwardly, a sash load carrying strip of elastic deformable material covering said lateral leg, a metal sash bounding the edge of the window glass for peripherally seating on said strip and a series of spring clips detachably connected with said sash and extended therefrom with a lateral bridging portion overlying the inner edge of the first mentioned leg of the supporting ledge and terminating in an outwardly projecting spring blade which bears on the rear face of said first mentioned leg.

2. In combination, an L-section supporting ledge bounding a window opening, a sash supported by the ledge with its periphery and inner side in mating relation with the L-section ledge and with its outer side exposed beyond the ledge, a strip of elastic deformable material of L-section lining the sash receiving ledge and interposed in compression between the ledge and the periphery and inner side of the sash and a series of spaced retaining clips secured to the sash in bridging relation to the L-section ledge and the compressed strip each with a free end resilient leg projected peripherally outwardly of and laterally spaced from the sash for frictional seating engagement with the rear face of the inwardly extending leg of said L-section ledge.

3. In combination, a window sash and a frame therefor, both having complementary internal flanges extending in substantially spaced parallelism and generally in the direction of the window glass, a rubber lining in compression between said flanges, and a series of spaced retaining clips of substantially U-shaped spring metal fitted to said flanges.

4. The structure of claim 3 wherein at least one of the legs of the clip and the flange engaged thereby have interlocking formations to resist separation.

5. In combination, a window sash and a frame therefor, both having complementary internal flanges extending in substantially spaced parallelism and generally in the direction of the window glass, a rubber lining in compression between said flanges, and a series of spaced retaining clips secured to one of the flanges with a free end spring leg in bearing contact with a remote face of the other flange.

6. The structure of claim 5 together with a trim molding strip secured to the frame with a portion overlapping said clips to resist displacement thereof.

7. In combination, a window sash and a frame therefor, both having complementary internal flanges extending in substantially spaced parallelism and generally in the direction of the window glass, a rubber lining in compression between said flanges, a laterally projecting extension integral with the sash flange and overlying the inner edge of the frame flange and a series of spaced retaining clips, each having a pair of laterally extending tabs projected through openings in said extension and bent behind the same for retaining the clip thereto and also having a spring finger in seating contact with the frame flange.

KENNETH E. COPPOCK.
GLEN A. SMITH.

REFERENCES CITED

The following references are of record in the file of this patent:

UNITED STATES PATENTS

| Number | Name | Date |
|---|---|---|
| 1,149,145 | Forsyth | Aug. 3, 1915 |
| 1,385,217 | Lutz | July 19, 1921 |
| 1,455,340 | Kellogg | May 15, 1923 |
| 1,705,486 | Lang | Mar. 19, 1929 |
| 2,070,676 | Northup | Feb. 16, 1937 |
| 2,160,068 | Graebner et al. | May 30, 1939 |
| 2,171,191 | Potter | Aug. 29, 1939 |
| 2,232,810 | Simpson et al. | Feb. 25, 1941 |
| 2,242,746 | Dean | May 20, 1941 |
| 2,249,547 | Balfe | July 15, 1941 |